US005544162A

United States Patent [19]

Mraz et al.

[11] Patent Number: 5,544,162
[45] Date of Patent: Aug. 6, 1996

[54] IP BRIDGE FOR PARALLEL MACHINES

[75] Inventors: Ronald Mraz, Millwood; Michael M. Tsao, Yorktown Heights, both of N.Y.

[73] Assignee: International Business Machines Corporation, Armonk, N.Y.

[21] Appl. No.: 370,913

[22] Filed: Jan. 10, 1995

[51] Int. Cl.⁶ ............................ H04L 12/46; H04L 12/56
[52] U.S. Cl. ..................... 370/60; 370/85.13; 370/94.1
[58] Field of Search .................................. 395/311, 312, 395/200.20, 200.01; 370/60, 60.1, 94.1, 94.2, 85.13, 85.14, 85.9

[56] References Cited

U.S. PATENT DOCUMENTS

| | | | |
|---|---|---|---|
| 4,597,078 | 6/1986 | Kempf | 370/94 |
| 4,734,908 | 3/1988 | Hedlund | 370/60 |
| 4,797,881 | 1/1989 | Ben-Artzi | 370/88 |
| 4,866,704 | 9/1989 | Bergman | 370/94.1 |
| 5,095,480 | 3/1992 | Fenner | 370/22 |
| 5,130,975 | 7/1992 | Akata | 370/60 |
| 5,187,780 | 2/1993 | Clark et al. | 395/325 |
| 5,243,699 | 9/1993 | Nikolls et al. | 395/275 |
| 5,247,520 | 9/1993 | Geise et al. | 370/94.1 |
| 5,280,474 | 1/1994 | Nickolls et al. | 370/60 |
| 5,309,437 | 5/1994 | Perlman et al. | 370/85.13 |
| 5,339,396 | 8/1994 | Muramatsu | 395/312 |
| 5,371,852 | 12/1994 | Attanasio et al. | 370/60 |

OTHER PUBLICATIONS

Wm. J. Clark, "Understanding Asynchronous Transfer Mode (ATM)" 1993 Cabletron Systems–Understanding ATM.

*Primary Examiner*—Wellington Chin
*Attorney, Agent, or Firm*—Robert P. Tassinari, Jr.

[57] ABSTRACT

This invention is a high performance, standard IO interconnect "bridge" hardware for a parallel machine with a packet switching network in place. Combining new hardware and new software, this bridge connects parallel processors to the external world. The hardware is a "bridge" connecting an internal inter-processor switch to external asynchronous transfer node networks. The software is a "mirror" for making the connections. The invention provides high bandwidth, low latency and deterministic performance, and is inexpensive to build.

6 Claims, 4 Drawing Sheets

IP BRIDGE FOR PARALLEL MACHINES

FIELD OF THE INVENTION

The invention is related to parallel processing machines, and in particular to an Internet connection for such machines.

BACKGROUND OF THE INVENTION

Present methods for connecting parallel machines (e.g., IBM's 9076, models SP1 and SP2) to external LANs and WANs use a general purpose computer as an Internet Protocol (IP) Router. This method, however, is a low bandwidth, long latency, and expensive solution.

An alternative method is to use a general purpose LAN hub as the router, instead of a general purpose computer. However, there are many different types of hubs, each with a different method for transferring data among the many LAN and WAN adapter boards. It is very costly to build special parallel machine adapters for each one of these hubs.

A third method is to use a gateway router computer. A gateway router computer, however, cannot guarantee deterministic (or low variance) latency, as required for applications such as video servers. We define latency as the time it takes for a packet of data to traverse through a device, a gateway in this instance. Future applications that require high performance asynchronous transfer mode ("ATM") networks (for sending, e.g., video information) require guaranteed delivery of data packets at a deterministic interval. Therefore, the latency must be known beforehand. Otherwise, large amounts of buffering are required at the receiving end to smooth out the uneven delivery of data packets.

SUMMARY OF THE INVENTION

It is an object of the invention to provide a method for efficiently and inexpensively routing high bandwidth data transmissions.

The present invention achieves this by providing a method for transmitting data originating from a processor in a multiprocessor system to one of a plurality of destinations in the system or in an external network linked to the multiprocessor system, comprising:

generating a destination internet protocol address representing the desired destination for the data;

generating an internal source address representing the internal address of the source of the transmitted data;

generating an internal destination address representing the internal destination for the data, wherein the internal destination is a device within the multiprocessor system configured to direct the data to its desired destination;

attaching the destination internet protocol address, the internal destination associating each processor in the multiprocessor system with a different IO port of the system;

directing the data from the internal source to the IP destination via the internal destination.

FIGURES

Figure 3:
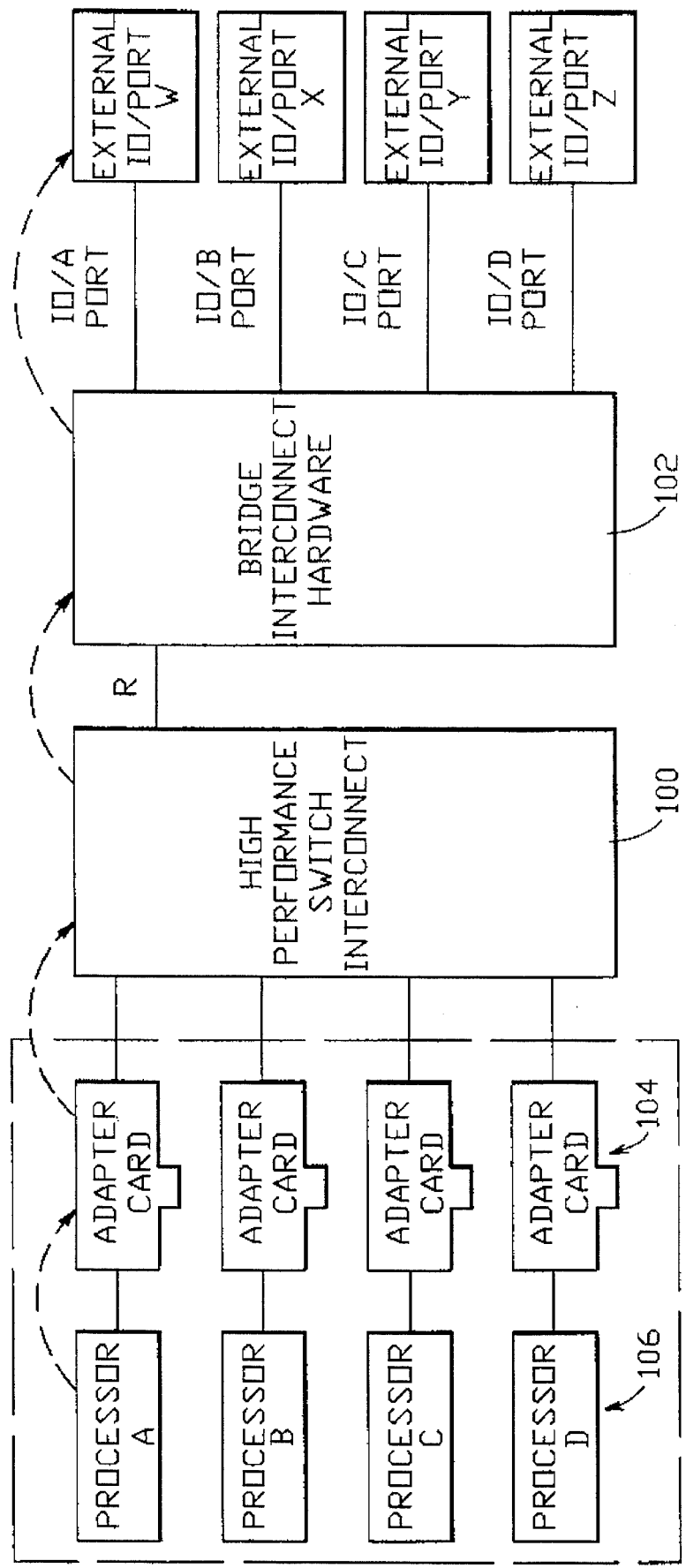

FIG. 3 demonstrates a direct-route packet send in the system of the invention.

Figure 4:
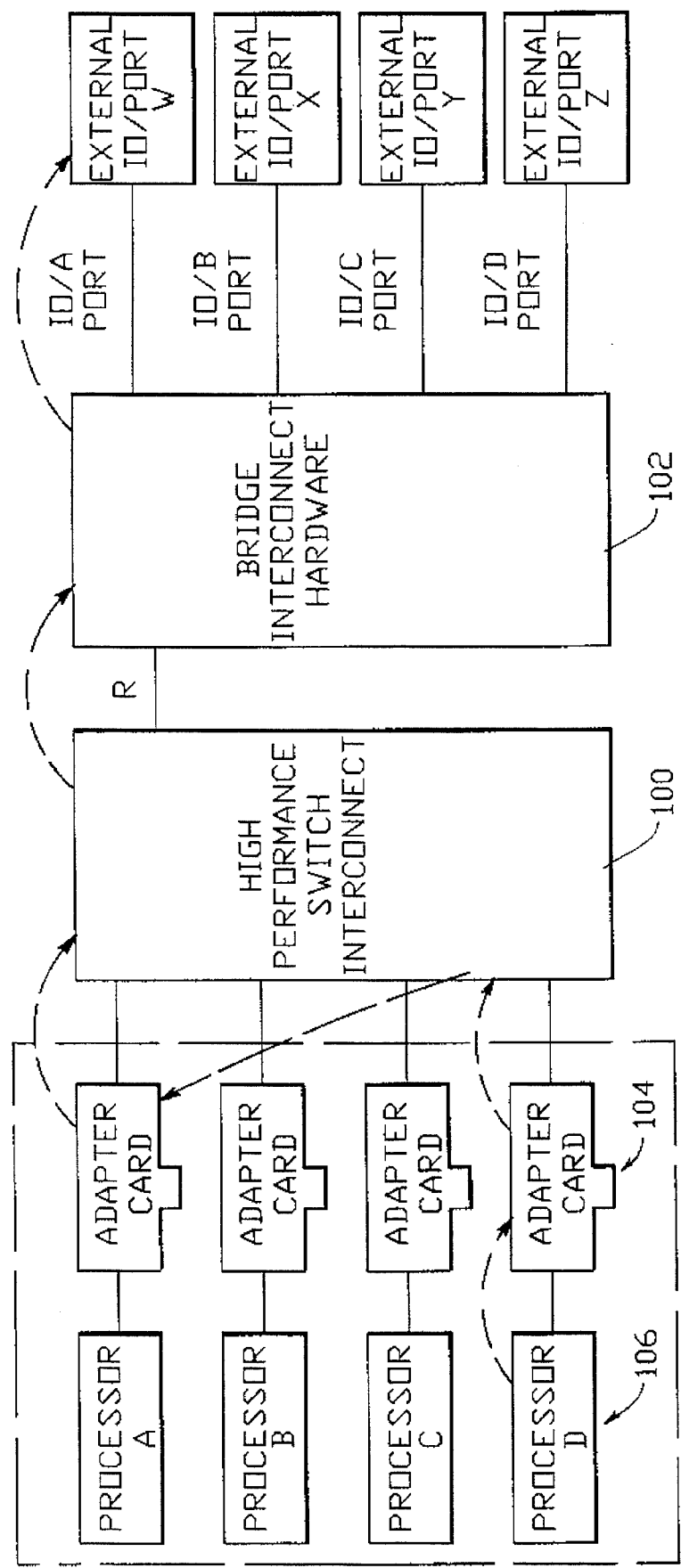

FIG. 4 demonstrates a mirrored-route packet send in the system of the invention.

DETAILED DESCRIPTION

This invention comprises a bridge, that is, a device for connecting two different media, and the associated software. On one side of the bridge is a parallel processor interconnection switch, which is internal to the processor to be connected. On the other side of the bridge is an industry standard ATM network. (ATM networks are described more fully in W. Clark, "Understanding Asynchronous Transfer Mode (ATM)" Cabletron Systems, 1993 ("Clark), which is incorporated herein by reference). The ATM network is not part of the bridge. IP traffic from the interconnection switch is received by a switch interface integrated circuit (IC) and directed to a dual-port RAM. When a sufficient amount of data has been received, transmission to the ATM commences. The ATM chips pull the data from the dual-port memory and send them out to the network.

This invention provides deterministic latency and a very low variance for parallel machine IO interconnects. This is because the design is such that competing traffic is minimized on any of the data paths internal to the parallel machine because the bandwidth of the parallel machine interconnect is much greater than the bandwidth required for the Internet connection. Another contributing factor is the nature of the controlling software. It executes only at specified instances: at the beginning and at the end of each IP packet (i.e., at the header processing and cleaning phases of each packet). Furthermore, the software operates in a fixed amount of time. There are no random events that can introduce variances into the communication path.

The novel method implemented by software allows this efficient "bridge" hardware to function as a router, or "hub", that routes packets into and out of the parallel machine. A technique we term as "mirroring" is used to route, or "reflect", these IP packets to the correct IO bridge route. Mirroring is scalable and is used on both outgoing and incoming packets. That is, the mirroring is scalable in the sense that capacity and capability can be increased incrementally in the system at a near-linear rate of improvement in performance. Thus, the present invention allows one to increase bandwidth without introducing additional latency or variance.

Figure 2:
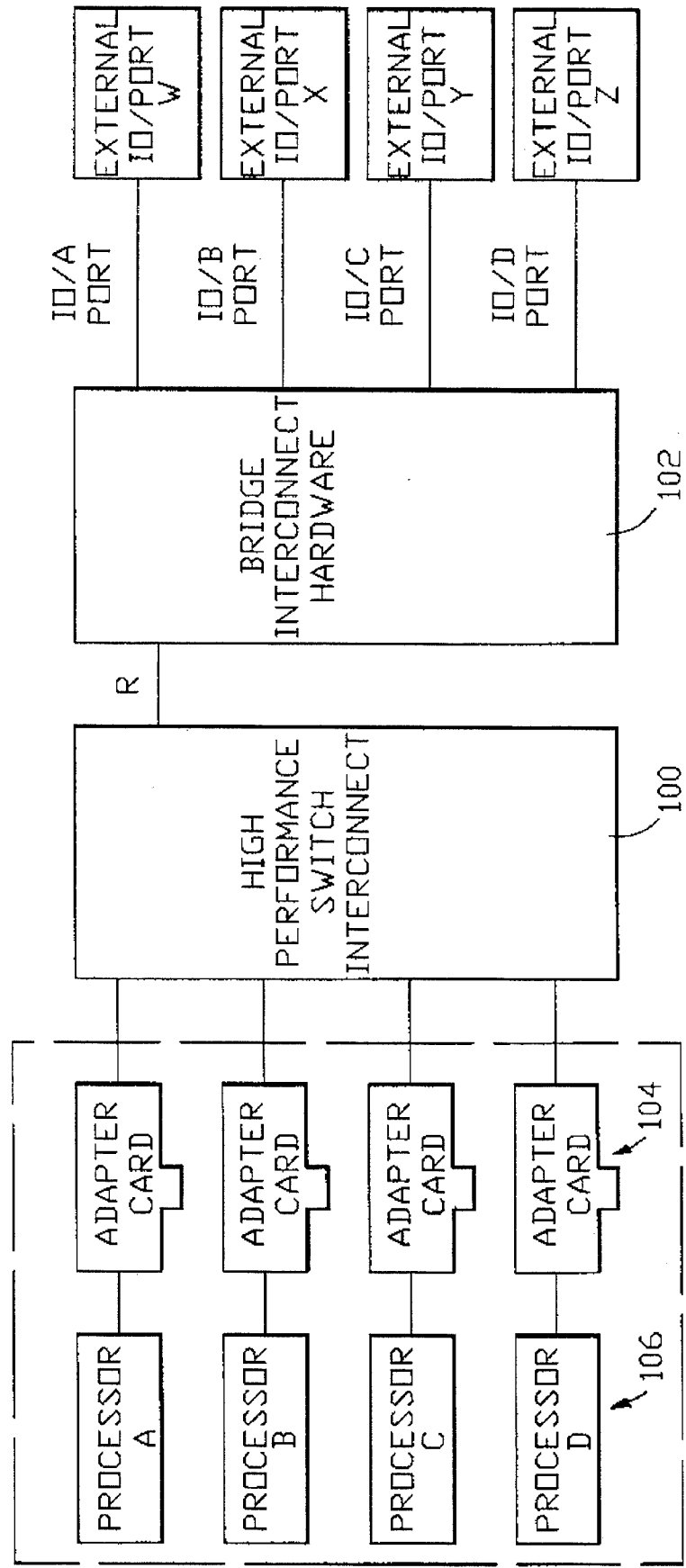
FIG. 2 shows a virtual mapping of processors to I/O ports in accordance with the invention.

In a preferred embodiment, the mirroring function is contained in microcode that resides in one of several places within the processing node (element 106, FIG. 2). Maximum benefit mirroring is derived by implementing the microcode within the communications adapter 104, FIG. 2, as will be discussed later. Alternative places for implementation are the processing node itself and the communications switch interface IC 102, FIG. 2.

System Hardware

Figure 1:
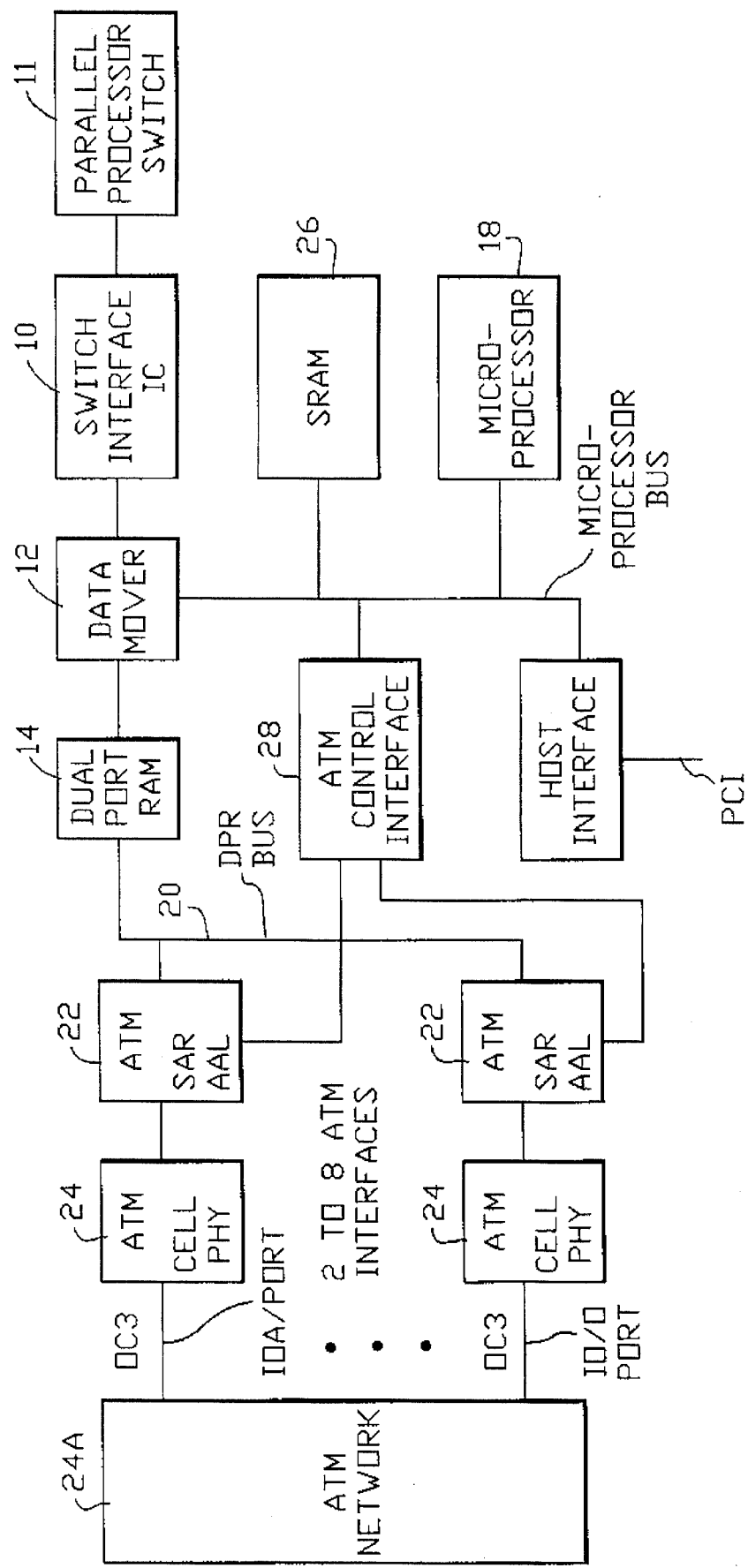
FIG. 1 is a block diagram of the system of the invention.

As shown in FIG. 1 by way of illustration, the present invention provides means for connecting a parallel processor switch 11 to standard wide area networks, such as ATM networks. A switch interface integrated circuit chip 10, which is an ASIC having data moving capability, is used to buffer data to/from the parallel processor switch 11. A data mover chip 12, also an ASIC having data moving capability, is used to connect the interface chip to a dual-port RAM 14 and microprocessor bus 16. A majority of the data traffic in this configuration is between the switch interface chip 10 and the dual-port RAM 14. Only occasionally does the microprocessor 18 communicate with the interface chip 10 or the dual-port RAM 14 (such as during header and trailer processing, and under non-standard conditions). Therefore, the data mover chip 12 serves to isolate the microprocessor bus 16 traffic from the traffic between the switch interface chip 10 and the dual-port RAM 14.

Following the main data traffic flow, the data to/from the parallel processor switch 11 passes through the data mover 12 and is stored in the dual-port RAM 14. The dual port RAM, therefore, is used to assemble and buffer the traffic between the two transmission media: the parallel processor switch 11 and the ATM network 24A, FIG. 1.

Once a sufficient (wherein sufficiency depends on the expected rate of data transmission into and out of RAM 14, and can be set dynamically) of data has arrived in the dual-port RAM 14, for example from the switch 11, data can be sent out toward the ATM side of the bridge. An entire IP packet, which can be up to over 65,000 bytes long, need not have to have completely arrived from the parallel processor switch before transmission to the ATM side initiates.

Since the bandwidth of the ATM is much less than that of the parallel processor switch, the bandwidth of the dual-port RAM 14 can support several ATM links simultaneously. For the ATM side, there are many kinds of segmentation and reassembly (SAR) chips available in the industry. Any one of them can be used in a preferred embodiment of this invention. The ATM SAR AAL chips 22 are connected on the dual-port RAM bus 20 (DPR BUS) to the dual-port RAM 14.

There are also many varieties of ATM physical layer chips 24. Any one of them will serve equally well.

The characteristics of the above-mentioned ATM components are described in Clark.

On the microprocessor bus is a microprocessor 18, static RAM 26, and an ATM control interface 28 to the ATM SAR chips 22. The microprocessor 18 executes control microcode which processes the IP headers and various interface specific control functions. Specifically, the microprocessor 18 examines the packet header to determine the desired destination. An additional function of microprocessor 18 is to direct the ATM SAR to begin reading data from dual port RAM 14 when a sufficient amount of data has been received in the RAM. Further, the microprocessor 18 processes the trailer byte at the end of a packet to initiate the appropriate cleanup functions. The static RAM 26 stores the programs and any temporary data structures used by the microprocessor 18 to perform its function. The ATM control interface 28, which comprises buffering and latching capability to enable communication between the microprocessor 18 and ATM SAR 22, enables the microprocessor to control the initialization and function of the ATM SAR chips.

In a preferred embodiment of the invention, the microprocessor 18 used to control the function of the IP bridge of the present invention will not be running general purpose operating system software. The housekeeping functions performed by such software are best left to a general purpose host computer. This can best be achieved by connecting the microprocessor bus 16 to a host computer through an industry standard host interface 28, such as PCI or Microchannel. In this way, a host computer can service several of these IP bridges together.

Software—Direct Route FIG. 2 shows a processor-to-IO port mapping, in accordance with the invention, of groups of processors to various external IO ports. In FIG. 2, the bridge interconnect hardware 102 is preferably implemented using the hardware configuration of FIG. 1. The high performance switch interconnect 100, adapter cards 104 and processors 106 are located within the parallel processing machine. In a preferred embodiment, the adapter cards 104 are physically located within the associated processor 106. The bridge interconnect hardware may be located external to the parallel processing machine, with inputs from the processor being provided by cables.

The processor-to-IO port mapping is performed based on the "source" address of the packet to be transferred (i.e., the address of the device initiating a transmission), the address being defined in hardware or programmable logic. In this arrangement, all packets destined to leave the system are directed from the originating processor to the IO port bound to the originating processor. The protocol of the bridge interconnect hardware is such that the IP packet is segmented, and the resulting segments each encapsulated in a parallel processor switch network routing header and trailer. The parallel network header (PNH) contains the address destination and source address within the parallel machine.

FIG. 3 shows the path a packet takes when travelling directly from a processor to a switch. This will occur only when the destination of an IP packet originating in, e.g., a processor, is the IO Port associated with that processor. As an example, if processor A is to communicate with external machine W, an IP packet is generated for destination W from source A. The PNH will contain a source address of A and a destination address of R, which is the link between 100 and 102 for IO port W. There may be one or more links similar to R, depending upon the number of external ports and internal processors. The links will be configured such that transmissions between an external port and a given processor will always travel on the same link.

Upon receiving the packet, the microprocessor 18 (of FIG. 1) operating with microcode examines the PNH header source field prior to discarding it. This field is used to route the IP packet to, in this case, the IO/A external port (because the source was a processor internal to the system). IP routing is then used for the remainder of the transmission to device W.

In the reverse situation, that is, when receiving a packet from the interface IO/A port, the bridge interconnect hardware (specifically microprocessor 18 of FIG. 1) automatically encapsulates the IP packet with a PNH header indicating source and destination fields of R and A, respectively. This instructs the parallel switching network to route the IP packet to processing node A. The communication adapter card associated with processor A identifies this packet as an IP packet and verifies that the source was the routing interface R. Since both the PNH destination and IP destination are for this node, the packet is received for further processing.

Software—Mirrored Route

Adapter 104 microcode compares of the source and destination fields of the PNH determine if mirroring is to be performed. Mirroring is required when the destination of an IP packet generated by, e.g., a processor, is an IO port not associated with that processor. In mirroring, all packets leaving the system are directed to the processor bound to the desired IO network (through local routing tables of the TCP/IP protocol (stored in the processor)). The processor receiving this packet is the processor associated with the desired IO port. This processor detects that mirroring is desired and "reflects" the packet to its IO network interface port. Detection is performed by examining the IP destination (i.e., the global destination address) and PNH source and destination fields (local addresses) of the PNH.

FIG. 4 shows how a packet travels from processor group D through a mirrored path to IO/A Port. Given that a packet from parallel machine D wishes to communicate with external machine W, an internet packet is generated for IP destination W from PNH source D. This raises a problem with standard systems because only processor A is configured to communicate with machine W. In accordance with the present invention, the novel network software is configured to route the IP packet from processor D to the reflecting node A with the PNH containing a source field of D and a PNH destination field of A. The reflecting node will, in every case, be the node associated with the desired IO port. Upon reception of the packet, the processor A interface adapter card examines the IP destination address and the PNH source. Since the source was another processor (namely D, and not an IO interface) and the desired IP destination was not A, the packet is reflected. Reflecting the packet requires the PNH source and destination fields to be changed, in the present example, to A and R, respectively. The packet is then successfully routed to the IO/A port.

In the reverse situation, that is, when receiving a packet from external device W on the interface IO/A port, the bridge interconnect hardware automatically encapsulates the IP packet with a PNH header having source and destination fields of R and A, respectively. This allows the parallel switching network to route the IP packet to processor A. The communication adapter card for processor A will identify this packet as an IP packet and verify that the source was the routing interface R. Because the IP destination is not intended for processor A (as determined from the IP destination field of the packet), the packet is reflected to the appropriate processor using a lookup table of IP address to Parallel Switch Node routing. This table is stored in the processor. That is, the IP destination address will be translated into a PNH destination field identifying the destination processor.

Although in a preferred embodiment, the tables which map the links between external IO ports and the internal processor are used for mirroring, they are only required for routing within the parallel machine and their size is static and bounded by the number of processors in the parallel machine. External device routing tables are generated and kept by the TCP/IP software in the computation nodes. This is desirable since this list of external devices is potentially large and dynamic. Further, the time to mirror a receiving packet can, therefore, be bounded by the time to search a list of n entries plus the time to reflect this packet back into the network.

Additionally, a processor can reside in the parallel machine that does not have a logical IO port mapping. These processors communicate to the IO ports exclusively through mirroring transfers to the designated ports. Therefore, all traffic to these processors would be mirrored.

We claim:

1. A method for transmitting data from a processor in a multiprocessor system to one of a plurality of destinations in the system or in an external network linked to the multiprocessor system via a plurality of IO ports of the system, comprising:

generating a destination Internet Protocol address representing a desired destination for the data;

generating an internal source address representing the internal address of the source of the transmitted data;

generating an internal destination address representing the internal destination for the data, wherein the internal destination is a device within the multiprocessor system configured to direct the data to the desired destination;

attaching the destination Internet Protocol address to the internal destination;

associating each internal destination in the multiprocessor system with a different one of the IO ports of the system;

if the desired destination is in an external network, directing the data from the internal source to the desired destination via the internal destination and the IO port associated with the internal destination, the IO port associated with the internal destination being coupled to receive signals from the internal destination;

if the desired destination is in the system, directing the data to the from the internal source to the desired destination via the internal destination.

2. The method of claim 1, wherein the step of directing the data from the internal source to the desired destination via the internal destination comprises:

transmitting the data and the destination Internet Protocol address to the internal destination wherein the internal destination is a processor in the multiprocessor system; and transmitting the data to the Internet Protocol address via the IO port associated with the internal destination processor.

3. The method of claim 2, further comprising transmitting data from the internal destination to its associated IO port via a bridge interconnect, the bridge interconnect comprising data buffering means and means for setting a data-received threshold, above which the data-buffering means will begin transferring data to the Internet Protocol destination.

4. The system of claim 2, further comprising dynamically setting a data threshold to a level at which to begin data transmission from the bridge to one of the IO ports.

5. The system of claim 4, wherein one or more of the processors does not map to any of the IO ports, the system further comprising means for routing data transmission signals from the one or more processors to one of the IO ports via the data transmitting means.

6. A system for transmitting data from a processor in a multiprocessor system having a plurality of processors to one of a plurality of destinations in the system or in an external network linked to the multiprocessor system via a plurality of IO ports of the multiprocessor system, comprising:

a plurality of external ports coupled to the external network;

a bridge coupled to receive data transmission signals from each of the processors and to apply the data transmission signals from a given one of the processors to an external port associated with the given processor;

means for transmitting data from any of the processors to any of the external ports or to any of the destinations in the system.

* * * * *